Dec. 16, 1930.  F. I. RAYMOND  1,785,425
APPARATUS FOR CONTROLLING HEATING SYSTEMS
Filed Jan. 3, 1928  4 Sheets-Sheet 1

Fig. 1.

Inventor
Fred. I. Raymond
Attorneys

Dec. 16, 1930.  F. I. RAYMOND  1,785,425
APPARATUS FOR CONTROLLING HEATING SYSTEMS
Filed Jan. 3, 1928  4 Sheets-Sheet 3

Inventor
Fred I. Raymond
Attorneys

Patented Dec. 16, 1930

1,785,425

UNITED STATES PATENT OFFICE

FRED I. RAYMOND, OF RIVER FOREST, ILLINOIS

APPARATUS FOR CONTROLLING HEATING SYSTEMS

Application filed January 3, 1928. Serial No. 244,225.

My invention relates to the control of heating systems, more especially heating systems using hot water as the heating medium, although the invention may be used in connection with other types of heating apparatus; and the primary object of the invention is to provide a novel apparatus for controlling the operation of the heater which heats the circulating medium so that a more uniform temperature is maintained in the house, room or other space designed to be heated than has been has been possible with known control systems, with consequent saving in fuel besides increased comfort to the occupants of the house or room.

Generally speaking the invention consists in a certain novel arrangement of the devices which control the operation of the heater, (for example, by opening and closing the dampers of a coal fire heater or by opening and shutting off the fuel valve of a gas or oil heater) whereby the temperature of the space to be heated is brought up to the desired point, 70° Fahrenheit for instance, when the fire is started up, as for example in the morning, and is thereafter kept at that temperature or approximately so, without the fluctuations above and below the desired temperature which are likely to occur, because of the time interval or lag between the actuation of the control mechanism and the full response thereto of the heater in respect to the increase or decrease of heat output.

The invention is illustrated and will be described as utilizing certain preferred controlling apparatuses. It is realized, however, that the principle of control which forms the basis of the invention might be employed to produce the desired result by the employment of quite different instrumentalities than those shown. I desire to be understood, therefore, as covering all apparatuses capable of carrying out the purposes of the invention which are within the scope of the hereto appended claims.

Referring first to Figs. 1 to 5 inclusive, 10 designates the heater of a hot water heating system. As shown the heater is a coal fire furnace having dampers 11 and 12 for control of the draft. These dampers are opened and closed by any suitable mechanism such as the electric motor 13, the rotor of which turns by 180° steps and is provided with arms 14, 15 to which are attached chains 16, 17 extending to the dampers 11 and 12, one of which dampers, it will be understood, will be opened when the other is closed.

Figure 1:
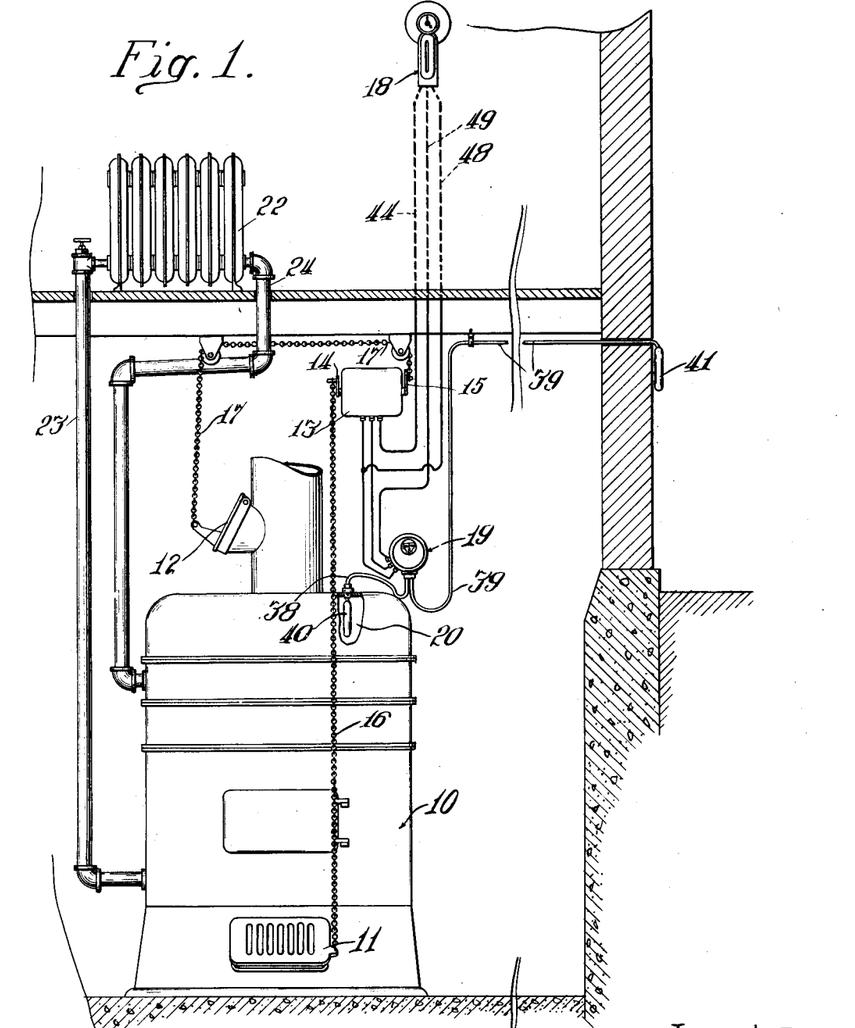
Fig. 1 is a vertical sectional elevation showing a heating apparatus controlled in accordance with my invention.

The motor 13 is controlled by the usual room thermostat 18, which may have a clock for changing its adjustment night and morning, and by a thermostat 19, the response of which is dependent on two factors, namely: first upon the temperature of the heating medium, for example the heating medium in the boiler or water space 20 of the heater; and, second, upon the temperature at some place other than the space heated and the water space of the heating system, for example upon the temperature of the outdoors atmosphere. In Fig. 1 I have shown a single radiator 22 connected by an inlet pipe 23 and a return pipe 24 with the heater 10. Ordinarily there will, of course, be a number of radiators connected to the same supply and return mains and located at different points of the house or other space to be heated.

Figures 3, 4, 5:
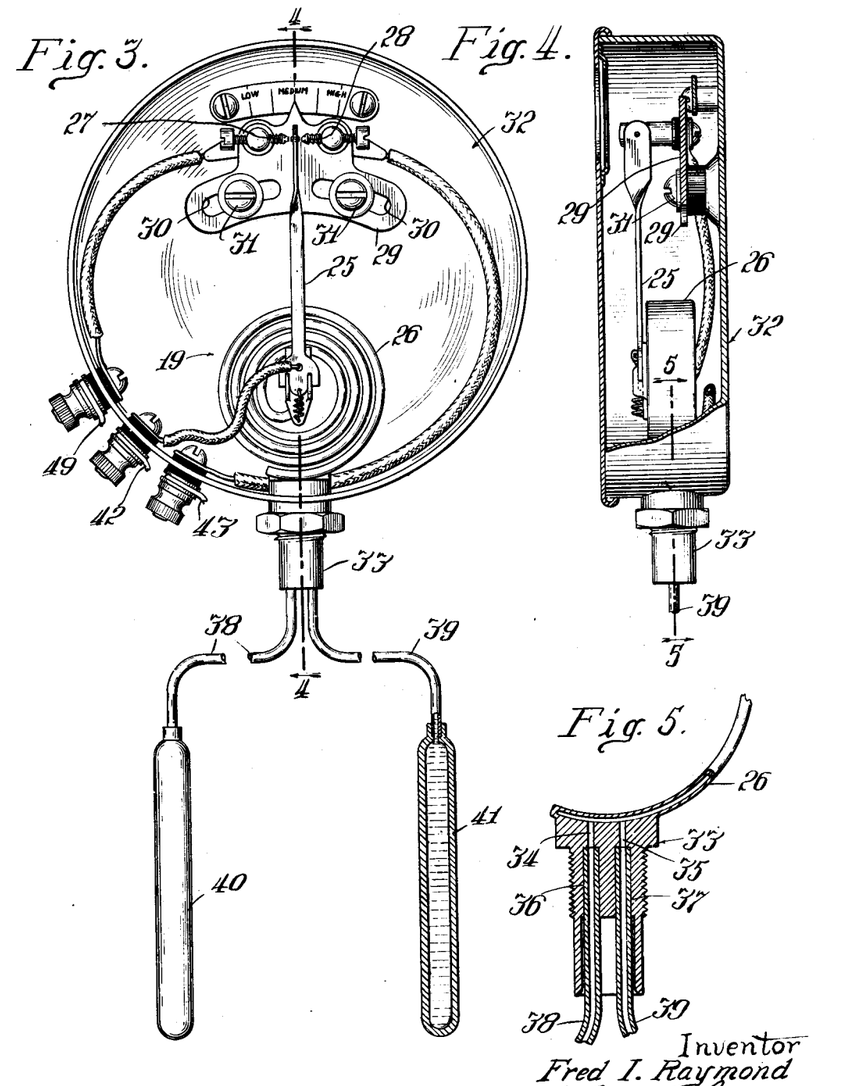
Fig. 3 is a sectional elevation of a thermostat forming part of the controlling mechanism, which is responsive to temperature fluctuations of both the heating medium and the outdoors atmosphere.
Fig. 4 is a cross sectional view of this device with parts shown in elevation.
Fig. 5 is a detailed sectional view on line 5—5 of Fig. 4.

In Figs. 3, 4 and 5 I have shown a thermostat suitable for response to fluctuations of both the heating medium and the outdoors atmosphere. The instrument consists of a switch arm 25 moved by means of the expansion and contraction, under the influence of an expansible fluid, of the spiral tubular coil 26, the switch arm moving between a pair of contacts 27, 28 arranged on a plate 29 having arcuate slots 30 for adjustment on the screws 31; the mechanism being shown as housed in a suitable housing 32. Extending through the lower part of housing 32 is a fitting 33 to which one end of the tubular coil 26 is secured. The fitting has bores 34, 35 (Fig. 5) communicating with the bore of the coil 26, and into the enlarged portions 36, 37 of these bores are fitted tubes 38, 39 on the ends of which are arranged bulbs or capsules 40, 41. The bulb 40 is placed so as to be influenced by temperature fluctuations of the heating medium, for example it may be arranged in the water space of the heater 10. The bulb 41 is preferably arranged outside of the building so as to be influenced by temperature fluctuations of the outdoors atmosphere. The bulbs 40, 41 may be of the same size or they may be of different sizes depending upon whether, in the particular installation, the water temperature and outdoor temperature act as equal factors in the control or otherwise. In any case the design of the thermostat 19 should be such that with a proper fire in the heater the heating system, considering this control alone, will keep the space to be heated at all outside temperatures and under the most unfavorable weather conditions, such as wind pressure, direction of the wind, lack of sunlight, etc., at a temperature somewhat above that desired to be maintained in the said space, at a temperature, for example, several degrees above 70° Fahrenheit.

Figure 2:
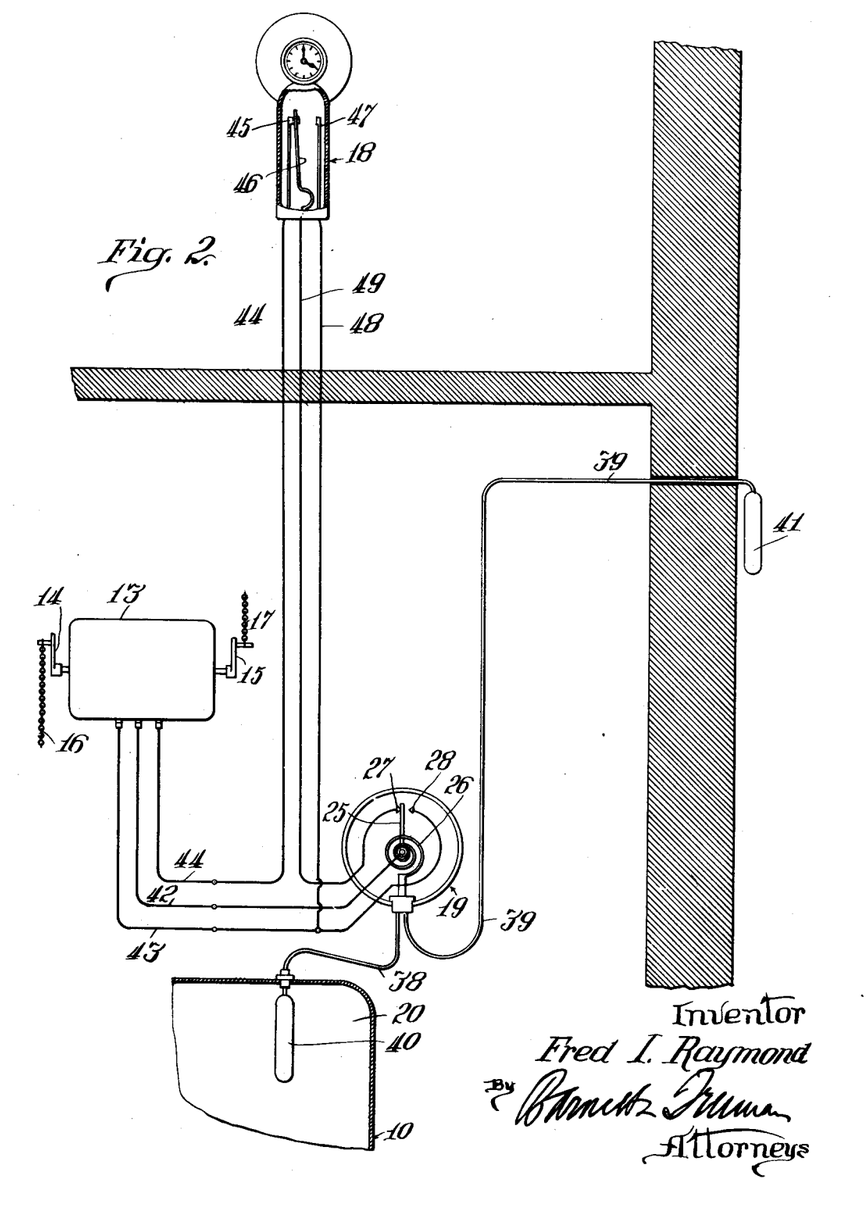
Fig. 2 is a diagram illustrating the operation of the control system.

*Operation.*—Referring now to the diagram of Fig. 2, which shows the parts of the thermostatic mechanism in the positions which they will occupy when the fire is first started up in the morning, that is, with both room temperature and heating medium temperature below the temperatures of response of their respective thermostats, the operation of the system will be as follows:

The starting up of the fire will heat the circulating water to such a point, ordinarily, that thermostat 19 will operate to slow down the fire before the room atmosphere has reached the temperature of response of thermostat 18, 70° for example. That is, the fluid in bulb 40 will expand and cause arm 25 to move away from contact 27 and against contact 28 closing a circuit through motor 13 over wires 42, 43. However, the response of thermostat 19 is not due solely to the temperature of the circulating medium. Outside temperature is also a factor of control so that on a cold day the temperature of the heating medium will rise to a higher point before the fire is slowed down than on a relatively warm day. In other words, while the temperature of the circulating medium, as it rises, imposes a limitation on the amount of heat imparted to the circulating medium, and consequently to the space being heated thereby, the temperature to which the heating medium will rise before its thermostat is actuated to slow down the fire is dependent, by automatic action, on the temperature of the outdoors atmosphere.

As soon as the water has cooled down, as the result of the closing of damper 11, to an extent sufficient to cause the switch arm 25 of thermostat 19 to move against the contact 27, and provided needle 46 of thermostat 18 is still against contact 45, motor 13 will be operated to open damper 11 and start up the fire through the closing of a circuit as follows: wires 42 and 44, contact 45 of thermostat 18, switch arm 46, wire 49 and contact 27 and switch arm 25 of thermostat 19. It may happen that the fire will be started up and slowed down in this manner several times before the room atmosphere reaches the temperature of response of thermostat 18. When, however, the room temperature reaches the point at which thermostat 18 is set, on rise of temperature, to respond, for example to 72° F., the switch arm 46 of this thermostat will be moved away from contact 45 and against contact 47 so as to close a circuit through the motor and cause the latter to slow down the fire; this circuit being as follows: wire 42, switch arm 25 of thermostat 19, contact 27, wire 49, contact arm 46 of thermostat 18 and wires 48, 43. The circuit just described is effective only if the water of the circulating medium is at a temperature below the temperature of response of the thermostat 19, since with the circulating water above the temperature of response of thermostat 19, the fire has already been slowed down by operation of such thermostat. If the room temperature falls below that for which thermostate 18 is set, and the circulating water is below the temperature of response of thermostat 19, the fire will be started up by closing of the following circuit through the motor; wire 42, switch arm 25 of thermostat 19, contact 27, wire 49, switch arm 46 of thermostat 18, contact 45 and wire 44.

It will be observed that on rise of temperatures of the heating medium and of atmosphere of the space to be heated, the fire will be slowed down by the operation of one thermostat or the other according to which is first to respond. However, on fall of these temperatures the fire cannot be started up until both have reached the temperatures of response of their respective thermostats. Imposed upon this dual control is a third control in accordance with which changes in outdoors temperature raise or lower the effective temperature of response of thermostat 19 subject to the water temperatures.

The system operates to maintain the room temperature very close to the lower temperature at which the thermostat 18 is set for operation. In accordance with old methods of control, the fire is not slowed down, for example after starting up the system in the morning, until the room atmosphere has reached the upper limit of the temperature at which the thermostat is set for operation. As a result the body of water circulating throughout the radiators ordinarily will have become so hot that after the draft has been closed and the fire slowed down the temperature of the space to be heated will continue to rise and may eventually reach a point considerably above that for which the thermostat 18 is set. This is due to the fact that the rate of radiation remains above that required to maintain the desired room temperature for some time after this temperature has been reached, as a result of the stored heat in the circulation medium or the continued activity of the fire after the control apparatus has been operated to check the fire, or the lag between radiator temperature and room temperature at the room thermostat or to a combination of some or all of these causes. Similarly when the room temperature falls below the point of response of thermostat 18, say to 68° F., the opening of the draft through the furnace will not produce an immediate rise of temperature in the room. On the contrary the temperature of the room is likely to continue sliding down. These fluctuations of room temperature above and below the temperature desired to be maintained will continue all day long.

This is due to the fact that when the upper limit of the desired room temperature range has been reached and the room thermostat acts to retard the fire, the circulating medium will be heated to a point where the rate of radiation is considerably above that required to simply maintain the room temperature. The room temperature continues to rise therefore after the fire is shut off until the circulating medium has cooled to a point where the rate of radiation is merely sufficient to maintain the room temperature. The extent that the room temperature rises after the fire is retarded is proportional to the excess of the rate of radiation at the time of retardation above that required to simply maintain the room temperature.

From that point the room temperature starts to fall but before it reaches the lower limit of the desired temperature range the fire will have been checked or the circulating medium will have cooled to a point where the rate of radiation is considerably below that required to maintain the desired room temperature. Consequently after the room thermostat acts to start up the fire the room temperature will continue to fall until the circulating medium is heated to a point where the rate of radiation is sufficient to maintain the room temperature. From this point the room temperature will commence to rise and the above cycle will be repeated throughout the day.

These fluctuations are largely done away with when my system of control is used for the following reasons:

Firstly, with my system the rate of radiation is always limited by the operation of the compound thermostat in the basement to that rate which is only slightly above the rate of radiation required to maintain the desired room temperature at any given time. Consequently, when the room thermostat operates to retard the fire there will be only a very slight rise in room temperature above that at which the room thermostat acts, since the subsequent rise in temperature is only caused by the excess in the rate of radiation over that required to maintain the room temperature. Moreover, since the rise in temperature is slight it will be of short duration.

Secondly, with my system the room thermostat does not act to maintain the room temperature between a high and a low limit as in the old systems but acts to maintain it at a point represented, in this particular embodiment of the invention, by the lower limit. With my system there will be many more accelerations and retardations of the fire during the day than with the old system, due to the action of the compound thermostat in the basement. After a retardation of the fire by the compound thermostat it is necessary that the room thermostat be in contact at its lower limit before the compound thermostat can cause another acceleration of the fire. Since the compound thermostat would ordinarily cause several accelerations and retardations of the fire during the time required for the room thermostat to travel from its low to its high limit, the compound thermostat will practically always act to retard the fire before the room thermostat reaches its upper limit. In fact, there will ordinarily be a retardation shortly after the needle of the room thermostat has left its lower contact. And the compound thermostat cannot then cause an acceleration until the needle of the room thermostat returns to its lower contact. In fact the upper contact of the room thermostat could be eliminated in my system for ordinary operation but it is desirable from the standpoint of safety.

The two functions above mentioned operating together give practically constant room temperature under all weather conditions, not only at the room thermostat but throughout the space heated. The radiators are ordinarily placed far from the room thermostat and in locations where the most heat is required. With the old system the room thermostat would show a fairly close control of temperature at the thermostat but the temperatures near the windows or radiators would fluctuate widely. With my system there will always be approximately the right amount of heat in the radiators to insure equable temperatures adjacent the radiators and windows as well as at the room thermostat.

It should be noted that the compound thermostat in the basement operating alone without a room thermostat will give a degree of room temperature regulation, but, due to the variables of wind, rain, sunshine and snow, it would not give uniform room temperature under varying conditions. Besides this it is difficult to calibrate the compound thermostat with close accuracy throughout its entire range of operation. Therefore the compound thermostat in my system is set at the highest point required under the most adverse weather conditions and the room thermostat is relied upon to take care of the variables introduced by wind, sunshine, rain, snow and the inaccuracies in the calibration of the compound thermostat. The second named function of my apparatus is not necessarily dependent upon the instrument 19 being thermostatically actuated. The advantage of the invention, in respect to the point control, could be obtained by an oscillating or two position mechanism the oscillations or changes of position of which were produced by other means as shown in a copending application Serial No. 370,610 filed June 13, 1929, which claims the point control feature generically.

Figure 6:
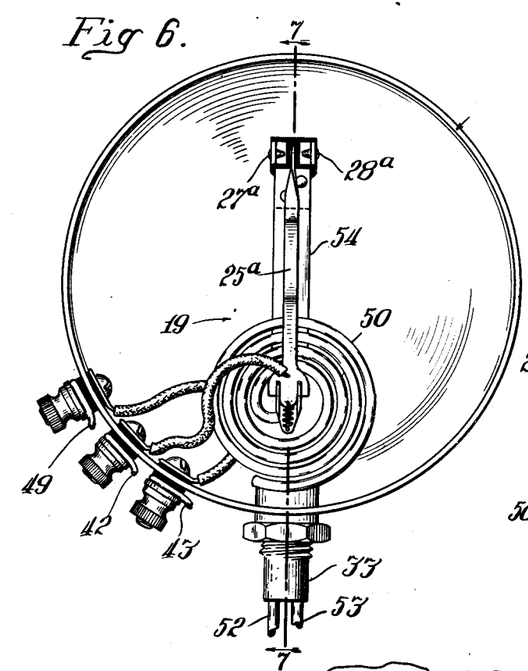
Fig. 6 is a view similar to Fig. 3 illustrating a modification.
Figure 7:
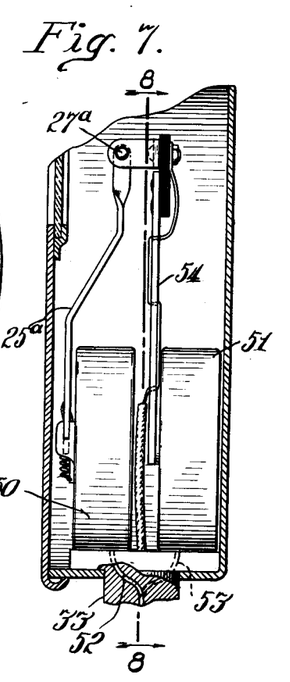
Fig. 7 is a fragmentary cross sectional view of the device shown in Fig. 6.
Figure 8:
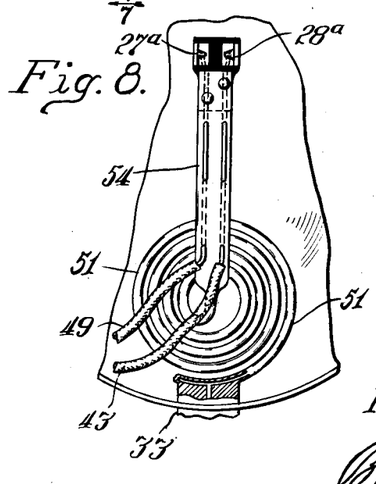
Fig. 8 is a fragmentary view with parts in section of the device of Figs. 6 and 7 taken on line 8—8 of Fig. 7.

Figs. 6, 7 and 8 illustrate a modified form of thermostat under control of circulation water and outside temperatures. In this thermostat there are two tubular coils 50, 51 to which are separately connected conduits 52, 53 leading to the bulbs 40, 41. The tubular coil 51 gives angular movement to an arm 54 carrying contacts 27ª, 28ª, the tubular coil 50 carries a contact switch arm 25ª which operates between contacts 27ª and 28ª. The arrangement is such that, as in the case of the thermostat of Figs. 3, 4 and 5, the temperature of response of the circulating medium is raised or lowered inversely with the changes in outdoors temperature. I do not claim herein either form of compound thermostat by itself as these instruments, as such, are claimed in a copending application, filed October 19, 1928, Serial No. 313,493.

It is obvious that this method of control could be applied to hot air, steam or vapor heating systems as well as to a hot water heating system and in the application to a steam system either the temperature or the pressure of the heating medium might be employed in the actuation of the compound thermostat. For instance if a thermostat such as is shown in Figures 6, 7 and 8 is used it would be possible to substitute an element responsive to the boiler pressure for the one shown as responsive to boiler temperature. The herein described method is illustrated in several different mechanical embodiments and is claimed as a method in a copending application Serial No. 293,293, filed July 16, 1928.

It should be noted that while the most sensitive operation of this system will result from placing the cold bulb of the compound instrument at a location where it is shielded from the sunshine and subject to a free circulation of the outside air, it may be located at any point preferred by the operator and may even be embedded in an outside wall of the building.

For a certain hot water heating system it has been found that 80 degrees F. is a good average of temperatures at which the compound thermostat should act. For an outdoors temperature of 50 degrees F. with this setting the heating water can rise only to 110 degrees F. For an outdoor temperature of 0 degrees F. the water can rise to 160 degrees F. Both of these water temperatures will give the results described above in my specification. In other cases where the heating system is very adequate the correct average of temperatures will fall as low as 75 degrees F. and where the heating system is very inadequate the correct average of temperatures may rise as high as 100 degrees F. All of the above figures are base upon a desired room temperature of 70 degrees F. It is desirable to keep the average temperature point within ten or fifteen degrees F. above the desired room temperature for best operation in mild weather. For this reason better results are obtained with an inadequate heating system by using a weighted average of the temperatures in the heating system and in the outdoor atmosphere the term "average" as used in the claims being intended to include such alternative mode of operation. This may be accomplished by using a larger bulb outdoors than in the heating system. For example, with an average temperature of 80 degrees F. and an outdoor bulb of relative volume 4 and a water bulb of relative volume 3 the following limits would result. At 50 degrees F. outdoors the water temperature could rise to 120 degrees F. instead of 110 degrees with equal bulbs. And at 0 degrees F. outdoors the water could rise to 187 degrees F. instead of 160 degrees F. The terms "circulating fluid" and "circulating medium" as used in the claims are intended to include the air of a hot air heating system as well as the water and steam of hot water and steam heating systems respectively to which latter the terms would be more literally applicable.

By the term "motor" is intended any instrumentality thermostatically actuated for controlling generation of heat or the application of heat to the heating medium whether by control of a furnace damper as in a coal burning furnace, or of the introduction of fuel through a burner as in a gas or oil burning furnace.

I claim:

1. In a heating system employing a circulating fluid as a medium, the combination of a heater for heating the circulating medium, a thermostat responsive to temperature fluctuations in the space to be heated, a thermostat the response of which is conditioned upon temperature fluctuations of the medium and also of the outdoors atmosphere, and mechanism for controlling the heater which is governed by the joint action of said thermostats.

2. In a heating system employing a circulating fluid as a medium, the combination of a heater for heating the circulating medium, a thermostat responsive to temperature fluctuations in the space to be heated, a fluid pressure operated thermostat the actuating fluid of which is subject to the temperatures of both the heating medium and outdoors atmosphere, and mechanism for controlling the heater which is governed by the joint action of said two thermostats.

3. In a heating system employing a circulating fluid as a medium, the combination of a heater for heating the circulating medium, a thermostat responsive to temperature fluctuations of the space to be heated, a fluid pressure operated thermostat having a branched conduit and two bulbs for its actuating fluid, one bulb located in the heating medium and the other exposed to outdoors atmosphere, and mechanism for controlling the heater which is governed by the joint action of the said two thermostats.

4. In a heating system employing a circulating fluid as a medium, the combination of a heater for heating the circulating medium, mechanism for controlling the heater, two thermostats for actuating said mechanism, one responsive to temperature fluctuations in the space to be heated and the other responsive to temperature fluctuations in the heating medium, said thermostats operating on rise of temperatures, separately, dependent upon which one is first to respond to diminish the application of heat to the medium, and on fall of temperatures, conjointly, when both respond, to increase the application of heat to the medium and means whereby the response of said thermostat subject to the medium, is also conditioned on temperature variations of the outdoors atmosphere.

5. In a heating system employing a circulating fluid as a medium, the combination of a heater for heating the circulating medium, mechanism for controlling the heater, two thermostats for actuating said mechanism, one responsive to temperature fluctuations in the space to be heated and the other to temperature fluctuations in the heating medium, said thermostats operating, on rise of temperatures, separately, dependent upon which is first to respond, to diminish the application of heat to the medium, and, on fall of temperatures, conjointly when both respond, to increase the application of heat to the medium, said thermostat subject to the medium having a temperature responsive member arranged in the heating medium and also a temperature responsive member exposed to outdoors atmosphere.

6. In a heating system employing a circulating fluid as a medium, the combination of a heater for heating the circulating medium, mechanism for controlling the heater, two thermostats for actuating said mechanism, one responsive to temperature fluctuations in the space to be heated and the other to temperature fluctuations in the heating medium, said thermostats operating, on rise of temperatures, separately, dependent upon which is first to respond, to diminish the application of heat to the medium, and, on fall of temperatures, when both respond, to increase the application of heat to the medium, said thermostat responsive to the medium being actuated by an expansible fluid and having a branched conduit and two bulbs for said fluid, one bulb located so as to be influenced by the temperature of the heating medium, and the other so as to be influenced by the temperature of the outdoors atmosphere.

7. In a heating system employing a circulating fluid as a medium, the combination of a heater for heating the circulating medium, a thermostat responsive to temperature fluctuations in the space to be heated, another thermostat comprising spaced contacts, a vibrating switch arm, a tubular coil for operating the switch arm and two bulbs connected with said coil and containing an expansible fluid, one bulb being located in the heating medium and the other exposed to the outdoors atmosphere, and mechanism whereby on rise of temperatures, said thermostats operate separately depending upon which responds first to decrease the application of heat to the heating medium, and on fall of temperatures, in both the space to be heated and the heating medium to predetermined points to increase the application of heat to the heating medium.

8. In a heating system, the combination of a heater for heating the circulating medium, a thermostat responsive to temperature fluctuations in the space to be heated, a second thermostat comprising two tubular coils, a bulb connected with each of said coils and containing an expansive fluid, one bulb being located in the heating medium and the other exposed to the outdoors atmosphere, an arm on one of said coils carrying a pair of spaced contacts, and a switch arm on the other coil operating between said contacts, whereby said thermostats respond to the average of the temperature of the heating medium and the outdoors temperature, and means whereby on rise of temperatures of the space to be heated and of the medium the application of heat to the circulating medium is diminished by one of said thermostats or the other, dependent upon which responds first, and on falling of both said temperatures to given points, the application of heat to the circulating medium is increased.

9. Mechanism for controlling the application of heat to the circulating medium of a heating system comprising a thermostat responsive to the temperature fluctuations of the space to be heated, a thermostat responsive to the temperature fluctuations of the circulating medium and means whereby the temperature of response of said last named thermostat is varied inversely to the temperature fluctuations of the outdoors atmosphere.

10. In a heating system using a circulating fluid as a heating medium, means responsive to the average of the outdoors temperature and the temperature of a heating medium for limiting the temperature of the heating medium to a point slightly higher than that required to maintain the desired temperature in the space to be heated, and means responsive to temperature in said space for diminishing the temperature of the heating medium when the desired temperature in said space is reached.

11. In a heating system using a circulating fluid as a heating medium, means responsive to the outdoors temperature and also to the temperature of the heating medium for limiting the temperature of the heating medium to a point slightly higher than that required to maintain the desired temperature in the space to be heated, and means responsive to temperature in said space for diminishing the temperature of the heating medium when the desired temperature in said space is reached.

12. In a heating system using a circulating fluid as a heating medium, means responsive to the average of the outdoors temperature and the temperature of the heating medium for limiting the temperature of a heating medium to a point between 5° F. and 30° F. above the temperature desired to be maintained in the space to be heated, and means responsive to temperature in said space for diminishing the temperature of the heating medium when the desired temperature in said space is reached.

13. In apparatus for controlling a heating system, the combination of mechanism actuated in accordance with changes in the average of temperatures of the heating medium and outdoors atmosphere adapted to alternately accelerate and retard the delivery of heat to the space to be heated and means whereby the accelerating operation of said mechanism is dependent upon the temperature of said space being not in excess of a predetermined temperature.

14. Controlling mechanism for a heating system comprising two thermostats which operate independently to retard and conjointly to accelerate the introduction of heat to the space heated, one of said thermostats being responsive to temperature changes of the space heated and the other thermostat responsive to temperature changes of the heating medium at determinate temperatures which are raised and lowered as the outside temperature falls and rises.

15. Controlling mechanism for a heating system comprising two thermostats which operate independently to retard and conjointly to accelerate the introduction of heat to the space heated, one of said thermostats being responsive to temperature changes of the space heated and the other thermostat having two conjointly acting heat sensitive elements, one responsive to temperature changes of the heating medium and the other responsive to temperature changes of the outside atmosphere.

16. In controlling mechanism for a heating system the combination of a thermostat which actuates said controlling mechanism to retard and accelerate the introduction of heat to the space heated at upper and lower temperature limits which are raised and lowered inversely with respect to the outside temperature and a thermostat responsive to temperature changes in the space heated which conditions the controlling operation of the first named thermostat at one of said limits.

17. In controlling mechanism for a heating system the combination of a circuit making and breaking thermostat having high and low temperature contacts, a movable circuit closing member, and heat sensitive elements subject to temperature fluctuations of the heating medium and of the outside atmosphere respectively, and a circuit making and breaking thermostat in the space heated, the closing of a circuit through which conditions the controlling operation of the first named thermostat when its movable member is against one of its said contacts.

18. In controlling mechanism for a heating system the combination of a circuit making and breaking thermostat having high and low temperature contacts, a movable circuit closing member, and heat sensitive elements subject to temperature fluctuations of the heating medium and of the outside atmosphere respectively, and a circuit making and breaking thermostat in the space heated, the closing of a circuit through which conditions the controlling operation of the first named thermostat when its movable member is against the low temperature contact.

19. In a heating system the combination with a furnace and a motor for accelerating and retarding the action of the furnace, of a room thermostat having a circuit closing element and a low temperature contact in a circuit for actuating said motor to accelerate the furnace action, and a compound thermostat having a circuit closing element movable in accordance with temperature fluctuations of the heating medium and outside atmosphere; said compound thermostat having a high temperature contact in a circuit for actuating the motor to retard the furnace action and a low temperature contact in series with the low temperature contact of the room thermostat in a circuit for actuating the motor to accelerate the furnace action.

20. In a heating system the combination with a furnace and a motor for accelerating and retarding the action of the furnace, of a room thermostat having a circuit closing element and a low temperature contact in a circuit for actuating said motor to accelerate the furnace action, and a compound thermostat having a circuit closing element movable in accordance with temperature fluctuations of the heating medium and outside atmosphere, said compound thermostat having a low temperature contact in series with the low temperature contact of the room thermostat and a high temperature contact in a circuit for actuating the motor to retard the furnace action, said room thermostat having also a high temperature contact in series with the low temperature contact of the compound thermostat.

21. In a heating system the combination with a furnace and a motor for accelerating and retarding the action of the furnace, of a room thermostat and a compound thermostat actuated by the temperature fluctuations of the heating medium and outside atmosphere, said thermostats being adapted to actuate the motor to accelerate the furnace action but only when, on falling temperatures, both are in circuit closing positions, and said compound thermostat adapted, on rise of the temperature to which it is subjected, to actuate the motor to retard the furnace action, regardless of the operation of the room thermostat.

22. In an automatic temperature controlling device, an element adapted to be controlled by the temperature of a room, a second element adapted to be controlled by the temperature of a heat producing device, each of said elements and said heat producing device being included in an electric circuit whereby said elements control said device, said elements being connected in series and a third element mounted to modify the action of the second element, said third element being responsive to atmospheric temperature outside of a building.

23. In combination with a room thermostat and a heat producing device included in an electric circuit whereby the thermostat controls the device, an automatic controlling device of the class described comprising means actuated by the temperature of the heat producing device for additionally controlling the flow of current through said electric circuit and a second means associated with said last means for modifying the action thereof in controlling said circuit, said second means being influenced by a temperature other than the condition of the heat producing device.

FRED I. RAYMOND.